(12) United States Patent
O'Neil et al.

(10) Patent No.: US 6,404,745 B1
(45) Date of Patent: *Jun. 11, 2002

(54) METHOD AND APPARATUS FOR CENTRALIZED MULTIPOINT CONFERENCING IN A PACKET NETWORK

(75) Inventors: John E. O'Neil, Framingham; George W. Kajos, Westboro, both of MA (US)

(73) Assignee: Ezenia! Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/373,873

(22) Filed: Aug. 12, 1999

Related U.S. Application Data

(63) Continuation of application No. 08/710,480, filed on Sep. 18, 1996, now Pat. No. 5,963,547.

(51) Int. Cl.$^7$ .............................................. G04L 12/18
(52) U.S. Cl. ........................ 370/260; 370/390; 370/432; 348/14.09; 709/204
(58) Field of Search ................................. 370/259, 260, 370/261, 263, 264, 265, 267, 389, 390, 432; 348/12, 13, 14, 15, 17, 14.08, 14.09; 379/93.06, 93.08, 93.21, 201, 202; 709/204, 205

(56) References Cited

U.S. PATENT DOCUMENTS 5,361,256 A * 11/1994 Doeringer et al. ............ 370/60
5,473,363 A    12/1995 Ng et al. ........................ 348/15
5,600,646 A     2/1997 Polomski ...................... 370/263
5,608,726 A     3/1997 Virgile ......................... 370/401
5,778,187 A *   7/1998 Monteriro et al. ....... 395/200.61
5,787,084 A     7/1998 Hoang et al. ................ 370/390

OTHER PUBLICATIONS

"Line Transmission of Non–Telephone Signals—Visual Telephone Systems and Equipment for Local Area Networks Which Provide a Non–Guaranteed Quality of Service," Draft ITU–T Recommendation H.323, pp. i–v, 1–75, (Jan. 30, 1996).

* cited by examiner

Primary Examiner—Alpus H. Hsu
(74) Attorney, Agent, or Firm—Hamilton Brook Smith & Reynolds, P.c.

(57) ABSTRACT

A centralized multipoint conferencing arrangement uses a combination of multicast and unicast transmissions that is bandwidth efficient. A method of conferencing includes transmitting multimedia streams from endpoint terminals to a central resource such as a multipoint control unit (MCU) using unicast transmission. The multimedia streams are processed in the MCU and transmitted back to the endpoint terminals using multicast transmission. In addition, the MCU transmits other multimedia streams to selected endpoint terminals using unicast transmission. At the selected endpoint terminals, processing of the multimedia streams is inhibited in favor of processing the other multimedia streams.

23 Claims, 4 Drawing Sheets

METHOD AND APPARATUS FOR CENTRALIZED MULTIPOINT CONFERENCING IN A PACKET NETWORK

RELATED APPLICATIONS

This application is a Continuation of application Ser. No. 08/710,480, filed Sep. 18, 1996, now U.S. Pat. No. 5,963,547, the entire teachings of which are incorporated herein by reference.

BACKGROUND OF THE INVENTION

In multipoint conferencing, three or more endpoint terminals communicate with each other across a network. In the current telecommunications environment, multipoint conferencing is usually implemented over circuit-switched communication networks. Since connections are point-to-point in a circuit-switched network, a centralized resource, known as a multipoint control unit (MCU), is needed to link the multiple endpoints together. The MCU performs this linking by receiving multimedia (audio, video and/or data) information signals from endpoint terminals over point-to-point connections, processing the received information signals, and retransmitting the processed signals to selected endpoint terminals in the conference.

With the emergence of packet-based networks including local area networks, wide area networks and the Internet, multipoint conferencing is currently being defined for use over these packet-based networks. In packet-based networks, information is divided into blocks of data known as packets. Packets can be transmitted among endpoints using either unicast (i.e., one source to one destination) or multicast (one source to many destinations) transmission based on header information which contains appropriate unicast or multicast addressing information. Multicast is a technique that allows copies of a single packet to be transmitted to a selected subset of all possible destinations.

There are two methods known for multipoint conferencing using packet-based networks. These methods are referred to as "centralized" and "de-centralized" modes, respectively, in the draft ITU standard H.323 (ITU-T Draft Recommendation H.323: "Visual Telephone Systems and Equipment for Local Area Networks Which Provide a Non-Guaranteed Quality of Service", Jan. 30, 1996 incorporated herein by reference). In the centralized mode, endpoint terminals in a conference communicate with a centralized resource using unicast transmission. The centralized resource can be an MCU that provides control and processing functions to endpoint terminals in the conference. The MCU processing functions include mixing and switching of multimedia (audio, video and/or data) information streams received from the endpoints. In the centralized mode, the MCU unicasts these processed information streams to each endpoint terminal.

In the de-centralized mode, endpoint terminals multicast their multimedia information streams to all other endpoint terminals, rather than through an MCU. Each endpoint terminal is then responsible for selecting among the incoming streams and performing its own audio and video processing functions. If an MCU is included in a de-centralized system, it is used as a bridge between the multicast environment and a separate unicast environment.

SUMMARY OF THE INVENTION

The unicast nature of the centralized mode is bandwidth inefficient relative to the de-centralized mode. That is, for N endpoints, there are 2N unicast streams transmitted in the centralized mode: N streams sent toward the MCU and N streams sent from the MCU. Moreover, most of the N streams unicast from the MCU are likely to contain the same audio or video information. For the de-centralized mode without an MCU, there are only N streams transmitted among the endpoints using multicast transmission. However, as the number of endpoint terminals in a de-centralized conference grows, the amount of streams increases, requiring greater and faster processing at the endpoints. A need exists for a conferencing mode that provides the benefits of centralized processing and the bandwidth efficiency of multicast transmission.

The above and other problems are solved by the method and apparatus of the present invention. The present invention provides a centralized multipoint conferencing arrangement which uses a combination of multicast and unicast transmissions that is bandwidth efficient.

Accordingly, a method of conferencing includes transmitting multimedia streams from endpoint terminals to a central resource using unicast transmission. The multimedia streams are processed in the central resource and transmitted back to the endpoint terminals using multicast transmission. In addition, the central resource transmits other multimedia streams to selected endpoint terminals using unicast transmission. At the selected endpoint terminals, processing of the multicast multimedia streams is inhibited in favor of the unicast streams. In one embodiment, the selected endpoint terminals ignore the multicast multimedia streams upon receiving the unicast streams. In another embodiment, the central resource transmits a control command to the selected endpoint terminals to inhibit processing of the multicast streams.

According to one aspect of the invention, a selected endpoint terminal associated with a designated video broadcaster in a conference receives a unicast video stream in addition to the multicast streams.

According to another aspect of the invention, a selected endpoint terminal associated with a designated audio broadcaster in a conference receives a unicast audio stream in addition to the multicast streams.

BRIEF DESCRIPTION OF THE DRAWINGS

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Figure 1:
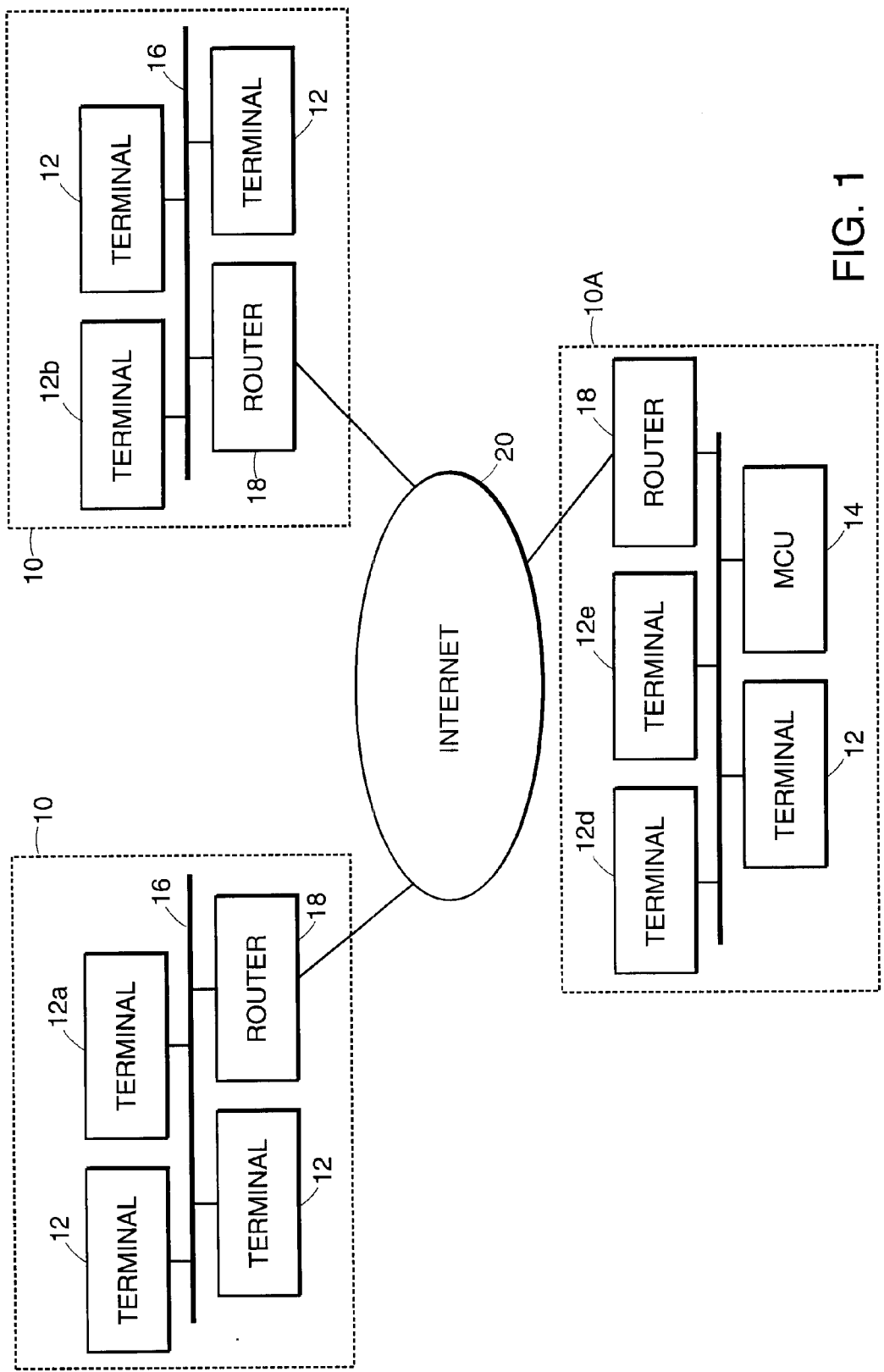
FIG. 1 is a schematic block diagram of an exemplary multipoint conferencing arrangement in accordance with the present invention.

Referring now to FIG. 1, a multipoint conferencing arrangement is shown which illustrates the principles of the present invention. The arrangement generally exists in a packet-based networking environment that includes several local networks 10 connected to a wide area network or internet 20. The local networks 10 are shared or switched medium, peer-to-peer communications networks in which packets are transmitted on a medium or bus 16 and are generally available to all entities on the local network. The network entities select among the packets those that are addressed to them. To reach entities that are not connected to the local network, a router 18 interconnects the local network to the internet 20. The routers 18 route packets from the source local network to a destination local network based upon network address information associated with the packets according to well-known internetworking protocols and standards.

In the preferred conferencing arrangement, the network entities include several endpoint terminals 12. The endpoint terminals 12 are terminals capable of sourcing and receiving information streams (video, audio, data, communications control, and call control) over logical channels established in accordance with ITU standard H.245 (ITU-T Recommendation H.245 (1995): "Control of Communications Between Visual Telephone Systems and Terminal Equipment") and as described in the above-referenced draft H.323 standard.

In addition to the endpoint terminals 12 in the local networks 10, a multipoint control unit (MCU) 14 is connected to local network 10A. The MCU 14 is an endpoint on the network 10A which provides the capability for two or more endpoint terminals 12 to communicate in a multipoint conference. The MCU 14 provides conference control and centralized processing of audio, video, and data streams in a multipoint conference. The centralized processing includes mixing and/or switching of the multimedia streams. A preferred embodiment MCU 14 is described further below.

Generally, the endpoints in known multipoint conferencing systems typically receive either a single video image or a composite image. The single video source is selected from among the conference endpoints according to a selection process. Typically, the selection process is based upon a comparison of the voice levels of the conference endpoints. The loudest conference endpoint is designated the principal video broadcaster while speaking. The principal video broadcaster is viewed by all other conference endpoints while the principal video broadcaster typically views another endpoint, such as the previous principal video broadcaster. In an alternative conference selection process, a conference operator selects an endpoint as the principal video broadcaster. A composite image is built from video sources selected in an analogous manner. That is, the video sources for the composite image are typically selected based upon a comparison of voice levels of the conference endpoints or, alternatively, under control of a conference operator. These selected conference endpoints are designated composite video broadcasters.

Similarly, the endpoints in known multipoint conferencing systems typically receive a mix of audio sources selected from among the conference endpoints based upon a comparison of voice levels of the conference endpoints or, alternatively, under control of a conference operator. These selected conference endpoints are designated audio broadcasters.

Figure 2:
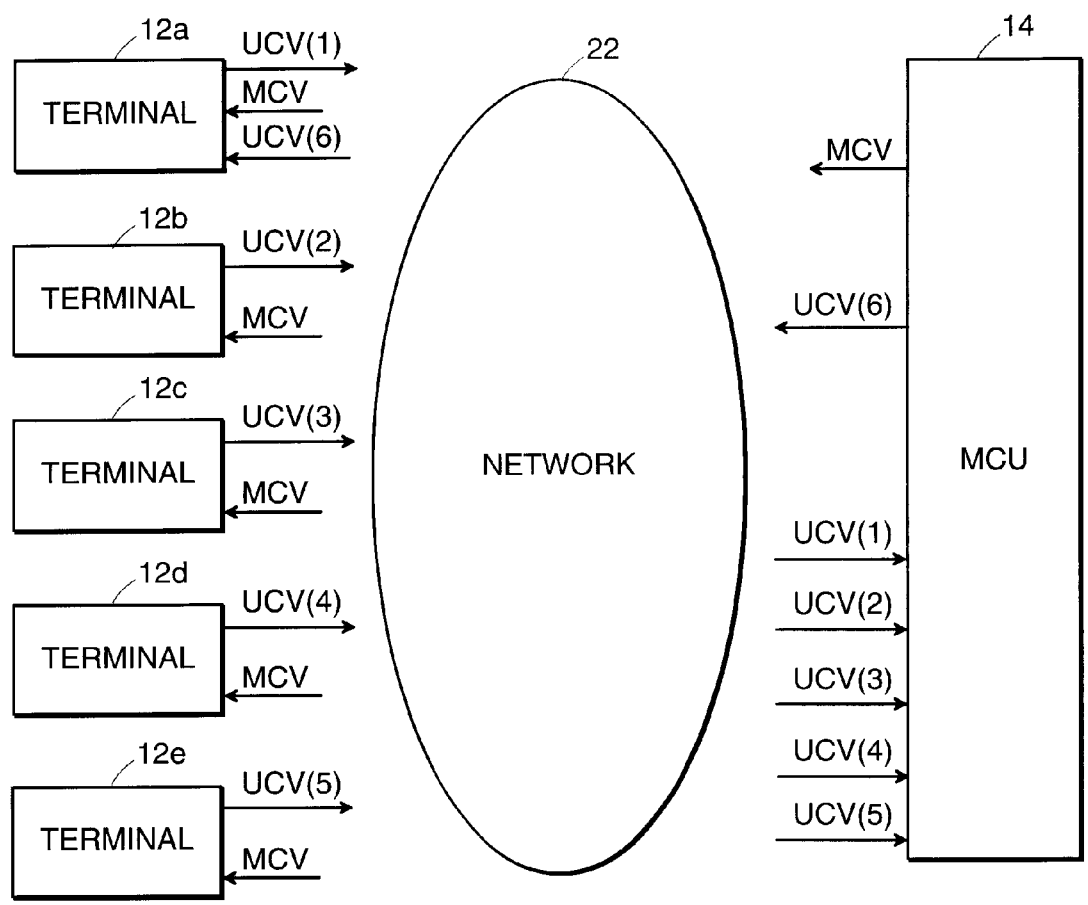
FIG. 2 is a schematic block diagram showing unicast and multicast transmission of video streams in accordance with the present invention.
Figure 3:
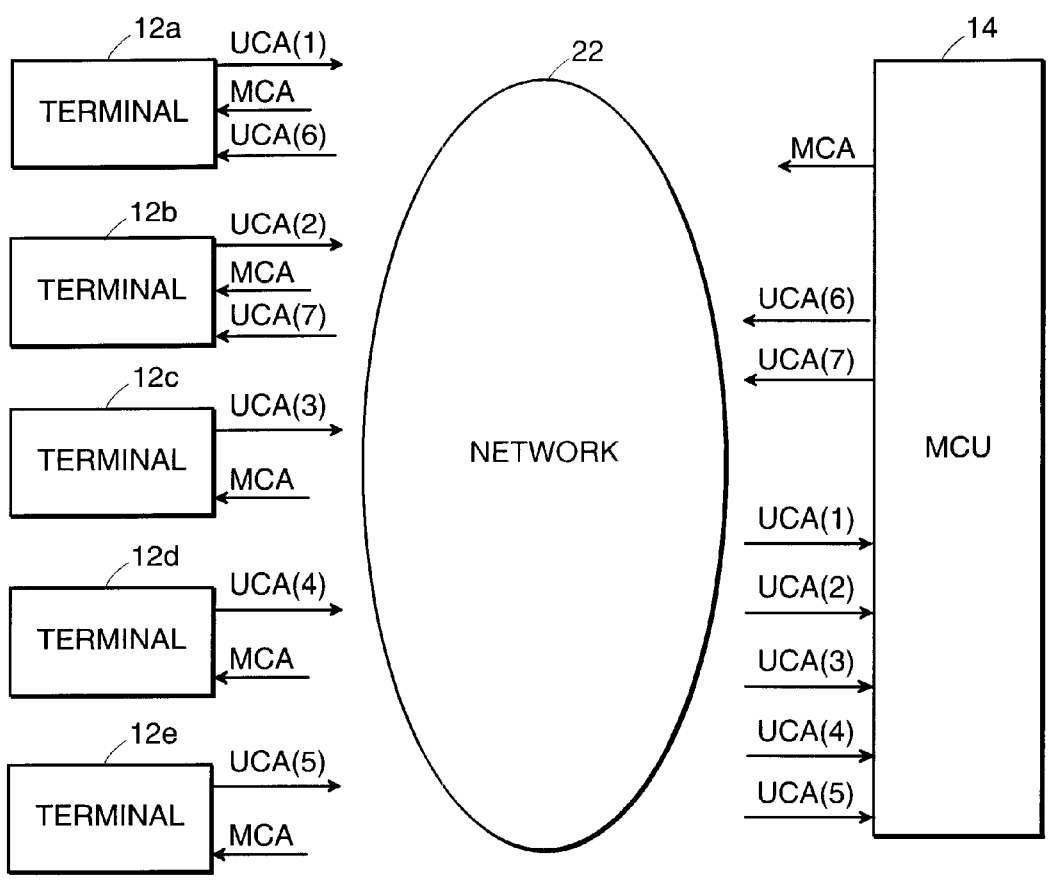
FIG. 3 is a schematic block diagram showing unicast and multicast transmission of audio streams in accordance with the present invention.

For purposes of illustrating the principles of the present invention, a multipoint conference will be assumed between the MCU 14 and participating terminals 12a through 12e. The conference can be setup using the call setup procedures generally defined in the draft H.323 standard. However, rather than specifying a conference mode of "centralized" or "de-centralized" as currently defined in the draft H.323 standard, the MCU 14 and endpoint terminals 12 communicate in an improved manner in accordance with the present invention and as shown in FIGS. 2 and 3 described further below.

As in a centralized mode conference, the endpoint terminals 12 in the present invention transmit audio and video streams to a unicast address of the MCU 14. The MCU 14 receives for processing the unicast streams from each endpoint terminal 12a–12e in the conference. In a preferred system, the MCU 14 mixes together up to four audio sources and either selects a video source or builds a composite video image from selected video sources to produce a "broadcast audio mix" and a "broadcast video mix", respectively. The composite image can be a continuous presence image as described in Polomski, U.S. patent application Ser. No. 08/379,274 filed Jan. 27, 1995 and assigned to VideoServer, the assignee of the present invention, and which is incorporated herein by reference.

These broadcast audio and video mixes are then transmitted by the MCU 14 on a single multicast address to all endpoints in the conference. The broadcast audio and video mixes are appropriate for most, but not all, endpoints in the conference. Instead, some endpoints require a different audio or video mix. For example, a speaker designated as one of the audio broadcasters in the conference should not receive the speaker's own voice stream in order to avoid hearing a delayed version of the speaker's voice as an echo. Thus, any endpoint terminal designated an audio broadcaster which provides an audio source stream included in the broadcast audio mix would not want to use that audio mix. Instead, those endpoint terminals should receive the audio mix minus their respective audio contribution to the mix.

A related problem exists for using the video mix. A designated principal or composite video broadcaster should not receive the broadcaster's own video stream. Thus, any endpoint terminal designated a video broadcaster which provides a video source stream included in the broadcast video mix would not want to use that video mix. Instead, those endpoint terminals should receive the video mix minus their respective video contribution to the mix.

To avoid the above problems, the centralized MCU 14 sends separate and distinct audio and video streams to those endpoints for which the broadcast mix is not appropriate. Referring now to FIGS. 2 and 3, the transmission arrangement of the present invention is shown for the video and audio streams, respectively. The arrows entering and exiting the terminals 12a–12e and the MCU 14 are meant to indicate unidirectional logical channels. The network 22 is meant to represent generally the combination of local networks 10 and internet 20. Separate H.245 control channels setup between the MCU and the endpoint terminals for controlling the logical channels are not shown.

In FIG. 2, each of the terminals 12a–12e transmits its individual video stream using unicast transmission towards the MCU 14. The unicast streams from the terminals are designated UCV(1), UCV(2), UCV(3), UCV(4) and UCV(5), respectively. Terminal 12a is the designated principal video broadcaster in the conference, meaning that terminals 12b, 12c, 12d and 12e should receive the video stream of terminal 12a. It is, therefore, appropriate for terminals 12b, 12c, 12d and 12e to receive from MCU 14 a multicast video stream, designated MCV, which comprises the terminal 12a video stream. The current designated video broadcaster, terminal 12a, however, instead receives a video stream associated with the last designated broadcaster. The MCU 14 accordingly sends a unicast video stream UCV(6) to the terminal 12a that comprises the last designated video broadcaster's video stream (either terminal 12b, 12c, 12d, or 12e).

FIG. 3 shows the transmission flow and logical channels associated with audio according to the present invention. Each of the terminals 12a–12e transmits its own audio stream to the MCU 14 in a unicast transmission, designated UCA(1), UCA(2), UCA(3), UCA(4), and UCA(5), respectively. While terminal 12a may be currently the loudest speaker for call control and video source selection, one or more of the audio source streams may be designated audio broadcasters and thus included in the "audio mix" produced by the MCU 14. For ease of illustration, the MCU 14 is assumed to use the audio streams from only the two current loudest sources to produce the audio mix. For the example of FIG. 3, endpoint terminals 12a and 12b are assumed to provide the current loudest sources or designated audio broadcasters. Thus, the MCU 14 transmits a multicast audio stream MCA comprising the audio mix of terminals 12a and 12b that is received by all of the endpoints. In addition, the MCU 14 transmits a unicast audio stream UCA(6) to terminal 12a comprising the audio stream of terminal 12b and a separate unicast audio stream UCA(7) to terminal 12b comprising the audio stream of terminal 12a.

As shown in FIGS. 2 and 3, all of the endpoint terminals 12a–12e receive a multicast video stream MCV and a multicast audio stream MCA. For those selected endpoint terminals which also receive separate unicast audio and/or video streams, there must be a way for the selected endpoints to decide which stream to process and use. In one embodiment, a selected endpoint terminal is programmed to recognize when both unicast and multicast streams have been received from the MCU 14. Upon recognizing receipt of both stream types, the selected endpoint terminal ignores the multicast stream in favor of processing the unicast stream. In another embodiment, the selected endpoint terminal is programmed to determine, upon receiving both unicast and multicast streams, whether its own source stream is included in the multicast stream. If this is the case, then the selected endpoint terminal processes only the unicast stream.

In a preferred embodiment, the selection between unicast and multicast streams at the selected endpoints is accomplished by inhibiting processing of the multicast stream using a flow control process. The H.245 standard defines a flowControlCommand message for throttling the bandwidth of a unidirectional logical channel. The flowControlCommand message is typically sent by the receiving endpoint of a H.245 logical channel towards the transmitting endpoint to indicate a requested change in the bitrate for the logical channel. In the present invention, however, a flowControlCommand message can be sent by the transmitting endpoint (i.e., MCU 14) of a logical channel towards the receiving endpoint (i.e., the selected endpoint terminal) to suspend processing of the multicast stream at the receiving endpoint.

The flowControlCommand message is sent on the separate H.245 control channel setup between the MCU and the endpoint terminal. A selected endpoint terminal receiving the flowControlCommand message for controlling a particular logical channel interprets the command to suspend processing of the multicast stream being received on that logical channel. When the selected endpoint terminal is no longer in need of receiving the special, non-broadcast mix streams, (e.g., unicast streams UCV(6) and UCA(6), UCA(7) in FIGS. 2 and 3 above) the MCU 14 sends another flowControlCommand message to indicate to the endpoint to resume processing of the multicast streams. The MCU 14 also at this time stops sending the special unicast streams to that endpoint terminal.

The efficiency gained with the method of the invention grows as the number of endpoints in the conference grows. In a conference with N endpoints, a centralized MCU 14 must transmit N audio/video streams, one for each endpoint. In the present invention, one multicast and K unicast streams are sent by the MCU 14, where K<N is the number of endpoints requiring special, non-broadcast mix streams.

Having described the method and system of the present invention, a preferred embodiment of an MCU 14 will now be described.

Figure 4:
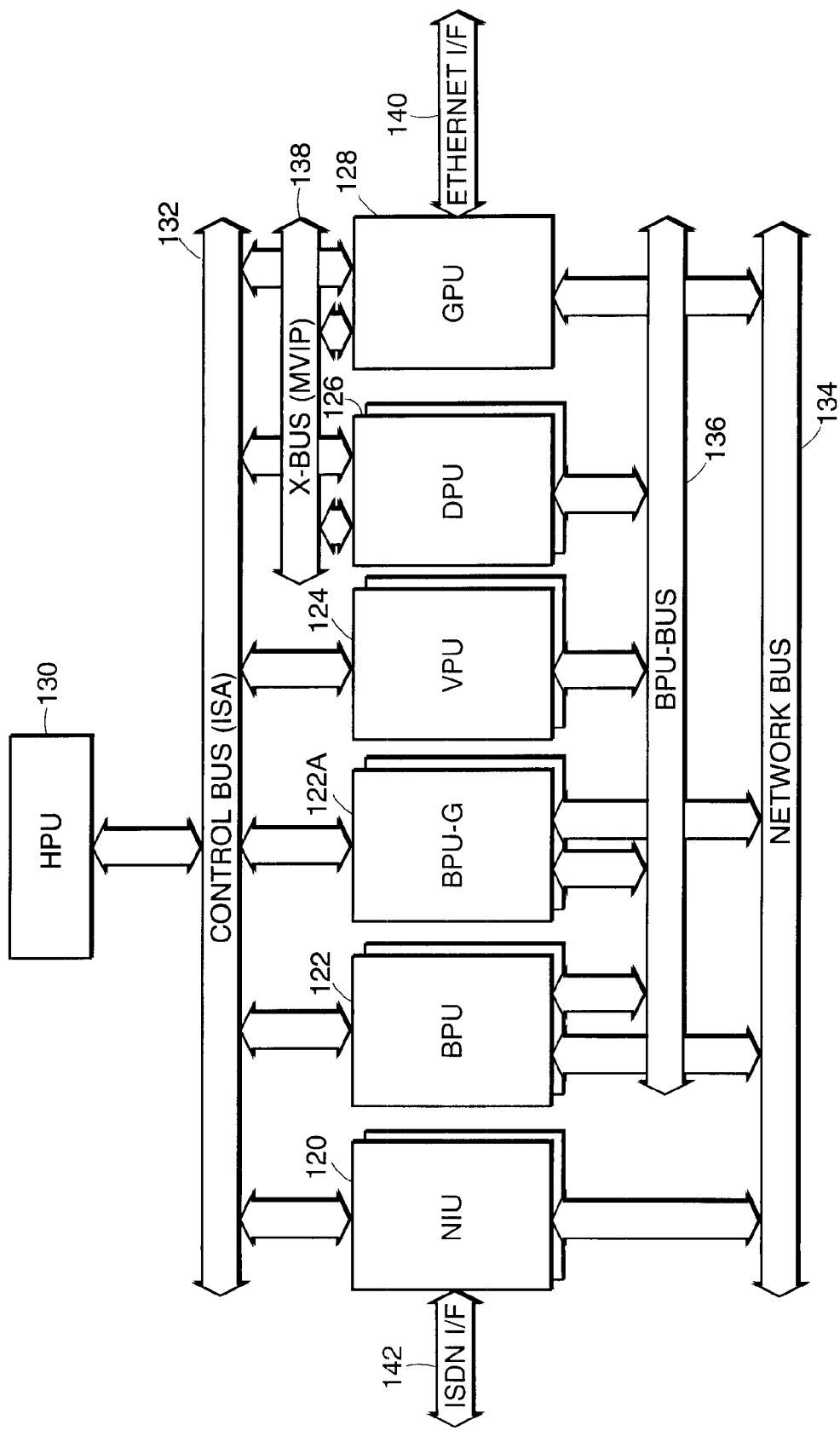
FIG. 4 is a schematic block diagram of a preferred embodiment of an MCU in accordance with the present invention.

Referring now to FIG. 4, there is shown an embodiment of MCU 14 installed in a host 80386 or 80486-based PC, disclosed in the above-referenced U.S. patent application Ser. No. 08/379,274, to which H.323 functionality has been added. The MCU 14 includes at least one Network Interface Unit (NIU) 120, at least one Bridge Processing Unit (BPU) 122, a Video Processing Unit (VPU) 124, a Data Processing Unit (DPU) 126, and a Host Processing Unit (HPU) 130. In addition to a host Industry Standard Architecture (ISA) bus 132, the MCU 14 includes a network bus 134, a BPU bus 136 and an X-bus 138. The network bus 134 complies with the Multi-Vendor Integration Protocol (MVIP) while the BPU bus 136 and the X-bus are derivatives of the MVIP specification. Each of the foregoing MCU elements are further described in the above-referenced patent application.

The H.323 functionality is provided by the addition of a Gateway Processing Unit (GPU) 128 and a modified BPU referred to as a BPU-G 122A. The GPU 128 runs H.323 protocols for call signaling and the creation and control of audio, video and data streams through an Ethernet or other LAN interface 140 to endpoint terminals 12 (FIG. 1). The BPU-G 122A is a BPU 122 which is programmed to process audio, video and data packets received from the GPU 128.

The MCU operation will now be described at a high-level, initially for circuit-based conferencing and then for packet-based H.323 conferencing. In circuit-based conferencing, digital data frames from H.320 circuit-based endpoint terminals (not shown) are made available on the network bus 134 through a network interface 142 to an NIU 120. The BPUs 122 process the data frames from the network bus 134 to produce data frames which are made available to other BPUs 122 on the BPU bus 136. The BPUs 122 also extract audio information from the data frames. The audio information is decoded to PCM data and made available on the BPU bus 136 for mixing with audio from other H.320 terminals by respective BPUs 122 in a conference. The BPUs 122 combine compressed video information and mixed encoded audio information into frames which are placed on the network bus 134 for transmission to respective H.320 terminals.

In a standard conference, the BPUs 122 perform video switching within a conference by selecting video data frames from timeslots on the BPU bus 136 and routing the frames to respective terminals in the conference. A particular BPU 122 selects the appropriate video data frames based upon the conference selection process described above. In conferences which use composite images or continuous presence, multiple video inputs are sent to the VPU 124 where the video inputs are decompressed, mixed and recompressed into a single video stream. This single video stream is then passed back through the BPU 122 which switches the video stream to the appropriate endpoint terminals.

For packet-based H.323 conferencing, the GPU 128 makes audio, video and data packets available on the network bus 134. The data packets are processed through the DPU 126. The BPU-G 122A processes audio and video packets from the network bus 134 to produce the audio and video broadcast mixes and the unicast streams which are placed on the network bus 134 for transmission to respective endpoint terminals 12 through the GPU 128. In addition, the BPU-G 122A processes audio and video packets to produce data frames which are made available to the BPUs 122 on the BPU bus 136. In this manner, the MCU 14 serves a gateway function whereby regular BPUs 122 and the BPU-G 122A can exchange audio and video between H.320 and H.323 terminals transparently.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of conferencing in a packet network, the method comprising:
   transmitting first multimedia streams from endpoint terminals to a central resource;
   processing the first multimedia streams in the central resource to generate second and third multimedia streams; and
   transmitting the second multimedia streams from the central resource to the endpoint terminals in a multicast packet transmission and transmitting the third multimedia streams to selected endpoint terminals, each third multimedia stream being transmitted in a unicast packet transmission.

2. The method of claim 1 further comprising inhibiting processing of the second multimedia streams at the selected endpoint terminals.

3. The method of claim 2 wherein inhibiting comprises transmitting a control message from the central resource to the selected endpoint terminals, the control message suspending a logical channel at the selected endpoint terminal associated with the second multimedia streams.

4. The method of claim 2 wherein inhibiting comprises ignoring the second multimedia streams at the selected endpoint terminals.

5. The method of claim 4 wherein a selected endpoint terminal ignores a second stream upon determining that the second stream includes information from the first multimedia stream of that selected endpoint terminal.

6. The method of claim 1 wherein transmitting the third multimedia streams includes transmitting a unicast video stream to a one of the selected endpoint terminals associated with a designated video broadcaster.

7. The method of claim 1 wherein transmitting the third multimedia streams includes transmitting a unicast audio stream to a one of the selected endpoint terminals associated with a designated audio broadcaster.

8. The method of claim 1 wherein the multimedia streams comprise video and audio streams.

9. A method of conferencing in a packet network, the method comprising:
   transmitting first video streams from endpoint terminals to a central resource;
   processing the first video streams in the central resource to generate second and third video streams; and
   transmitting the second video streams from the central resource to the endpoint terminals in a multicast transmission and transmitting the third video streams to selected endpoint terminals, each third video stream being transmitted in a unicast packet transmission.

10. The method of claim 9 further comprising inhibiting processing of the second video streams at the selected endpoint terminals.

11. The method of claim 10 wherein inhibiting comprises transmitting a control message from the central resource to the selected endpoint terminals, the control message suspending a logical channel at the selected endpoint terminal associated with the second video streams.

12. The method of claim 10 wherein inhibiting comprises ignoring the second video streams at the selected endpoint terminals.

13. The method of claim 12 wherein a selected endpoint terminal ignores a second stream upon determining that the second stream includes information from the first multimedia stream of that selected endpoint terminal.

14. The method of claim 9 wherein the selected endpoint terminals are each associated with a designated video broadcaster.

15. A multipoint conferencing system for use in a packet network, the system comprising:
   endpoint terminals for transmitting and receiving multimedia streams;
   a central resource operative to receive first multimedia streams from the endpoint terminals, process the first multimedia streams to second and third multimedia streams, transmit the second streams to the endpoint terminals in multicast packet transmission and transmit the third streams to selected endpoint terminals in unicast packet transmission.

16. The system of claim 15 wherein the central resource further comprises inhibiting means for inhibiting processing of the second multimedia streams at the selected endpoint terminals.

17. The system of claim 16 wherein the inhibiting means transmits a control message from the central resource to the selected endpoint terminals, the control message suspending a logical channel at the selected endpoint terminal associated with the second multimedia streams.

18. The system of claim 15 wherein the selected endpoint terminals ignore the second multimedia streams.

19. The system of claim 18 wherein a selected endpoint terminal ignores a second stream upon determining that the second stream includes information from the first multimedia stream of that selected endpoint terminal.

20. The system of claim 15 wherein a one of the selected endpoint terminals associated with a designated video broadcaster receives a unicast video stream.

21. The system of claim 15 wherein a one of the selected endpoint terminals associated with a designated audio broadcaster receives a unicast audio stream.

22. The system of claim 15 wherein the multimedia streams comprise video and audio streams.

23. A method of communication in a packet network, the method comprising:
   receiving at an endpoint terminal from a central resource a first multimedia stream in a multicast packet transmission and a second multimedia stream in a unicast packet transmission; and
   selecting one of the first and second multimedia streams for processing at the endpoint terminal, wherein selecting includes suspending a logical channel at the endpoint terminal associated with the first multimedia stream in response to receiving a control message from the central resource.

* * * * *